United States Patent [19]

Suzuki et al.

[11] Patent Number: 5,727,523
[45] Date of Patent: Mar. 17, 1998

[54] SUCTION AIR CONTROL APPARATUS OF INTERNAL COMBUSTION ENGINE

[75] Inventors: Norio Suzuki; Hiroki Munakata, both of Wako, Japan

[73] Assignee: Honda Giken Kogyo Kabushiki Kaisha, Tokyo, Japan

[21] Appl. No.: 795,311

[22] Filed: Feb. 3, 1997

[30] Foreign Application Priority Data

Feb. 5, 1996 [JP] Japan ................................ 8-040300

[51] Int. Cl.$^6$ ........................................ F02D 7/00
[52] U.S. Cl. ............................................ 123/399
[58] Field of Search ...................... 123/399, 339.15, 123/419

[56] References Cited

U.S. PATENT DOCUMENTS

| | | | |
|---|---|---|---|
| 5,065,131 | 11/1991 | Ohno et al. | 123/399 |
| 5,611,309 | 3/1997 | Kumagai et al. | 123/399 |
| 5,619,967 | 4/1997 | Streib | 123/399 |
| 5,622,151 | 4/1997 | Lang | 123/339.15 |
| 5,623,906 | 4/1997 | Storhok | 123/419 |

FOREIGN PATENT DOCUMENTS 5-31646  5/1993  Japan.
8-232707  9/1996  Japan.

*Primary Examiner*—Raymond A. Nelli
*Attorney, Agent, or Firm*—Armstrong, Westerman, Hattori, McLeland & Naughton

[57] ABSTRACT

A suction air control apparatus of an internal combustion engine which is subjected to an after-start lean-burn control to be operated at a lean mixture ratio rather than a theoretical mixture ratio is provided. According to the apparatus, a smooth operation of the engine in a transitional state when the after-start lean-burn control is canceled is ensured. The apparatus comprises throttle opening degree control means for driving a throttle valve of a suction system to control a throttle opening degree to a target throttle opening degree set in accordance with an operation state of the engine for regulating amount of the suction air, after-start lean-burn control cancel discrimination means for discriminating cancellation of the after-start lean-burn control of the engine, steep acceleration discrimination means for discriminating whether an acceleration of a vehicle is a steep acceleration higher than a predetermined acceleration or not, and throttle opening degree correction means for correcting the target throttle opening degree to limit increase of the target throttle opening degree when the after-start lean-burn control cancel discrimination means discriminates cancellation of the after-start lean-burn control and the steep acceleration discrimination means discriminates the steep acceleration of the vehicle.

4 Claims, 5 Drawing Sheets

SUCTION AIR CONTROL APPARATUS OF INTERNAL COMBUSTION ENGINE

BACKGROUND OF THE INVENTION

The present invention relates to a suction air control apparatus of an internal combustion engine which is subjected to an after-start lean-burn control to be operated at a lean mixture ratio rather than a theoretical mixture ratio in a duration immediately after starting.

Hitherto, in a duration immediately after start of an internal combustion engine, air-fuel ratio of mixture supplied to the internal combustion engine was controlled to a rich side compared with the theoretical ratio to ensure stability of engine turning. However, there was a disadvantage regarding removal of harmful components in the exhaust gas particularly HC.

Recently it has become possible to ensure the stability of engine turning even if the air-fuel ratio is controlled to lean side, so that the after-start lean-burn control wherein the engine is operated with the lean air-fuel ratio until a feedback control of the air-fuel ratio is commenced is carried out (Japanese Patent Publication No. Hei 5-31646 (1993)).

However, the after-start lean-burn control can not always be carried out in any operating condition after the internal combustion engine starts. When cooling water temperature of the internal combustion engine is lower than a predetermined temperature, atomization of the fuel is poor to deteriorate burning state and when the cooling water temperature is higher than a predetermined temperature, vapor is likely to be generated. Therefore, if a lean-burn control is carried out at such lower or higher temperature, there occurs problems such as lowering of stability of the engine turning, engine stall and the like.

Further, if the vehicle is run under the after-start lean-burn control, problems such as engine stall or poor acceleration feeling occur because of low output torque of the engine. Accordingly, it is proposed that the lean-burn control is canceled under a certain operation condition in order to dissolve the above-mentioned problems (Japanese Laid-Open Patent Publication No. Hei 8-232707 (1996) of which applicant is the same as the assignee of the present invention).

However, at a transitional stage from the lean-burn control to the rich-burn control after the after-start lean-burn control is canceled on snap or move, particularly in case that the accelerator pedal is pressed down largely and opening of the throttle valve becomes large rapidly, supply of fuel can not correspond to rapid increasing of suction air because of a delay of reading detection signal of throttle opening from a throttle opening sensor, a time lag until intake absolute pressure is influenced, a difference of fuel properties or adherence of the fuel to an inner surface of a suction pipe, accordingly, a lean condition occurs and output torque of the engine is insufficient to produce inconveniences such as so-called acceleration hesitation and knocking.

The acceleration hesitation and knocking are caused also by a delay of cancellation of the after-start lean-burn control.

SUMMARY OF THE INVENTION

The present invention has been accomplished in view of the foregoing and an object of the invention is to provide a suction air control apparatus of an internal combustion engine capable of ensure a smooth operation of the internal combustion engine in a transitional state when the after-start lean-burn control is canceled.

In order to attain the above object, the present invention provides a suction air control apparatus of an internal combustion engine which is subjected to an after-start lean-burn control to be operated at a lean mixture ratio rather than a theoretical mixture ratio in a duration immediately after starting, comprising throttle opening degree control means for driving a throttle valve of a suction system to control a throttle opening degree to a target throttle opening degree set in accordance with an operation state of the internal combustion engine for regulating amount of the suction air; after-start lean-burn control cancel discrimination means for discriminating cancellation of the after-start lean-burn control of the internal combustion engine; steep acceleration discrimination means for discriminating whether an acceleration of a vehicle is a steep acceleration higher than a predetermined acceleration or not; and throttle opening degree correction means for correcting the target throttle opening degree to limit increase of the target throttle opening degree when the after-start lean-burn control cancel discrimination means discriminates cancellation of the after-start lean-burn control and the steep acceleration discrimination means discriminates the steep acceleration of the vehicle.

If the steep acceleration discrimination means discriminates the steep acceleration of the vehicle in a transitional state when the after-start lean-burn control cancel discrimination means discriminates cancellation of the lean-burn control, the throttle opening degree correction means limits increase of the target throttle opening degree, so that increase of amount of the suction air is suppressed, occurrences of lean state, acceleration hesitation and knocking are prevented and a smooth operation of the internal combustion engine in the transitional state can be ensured.

The after-start lean-burn control cancel discrimination means may discriminate cancellation of the after-start lean-burn control based on an amount of pressing of an accelerator pedal or the target throttle opening degree. In this configuration, increasing supply of the fuel to follow the cancellation of the after-start lean-burn control can be carried out in advance before amount of the suction air increases actually in accordance with change of the throttle opening degree of the throttle valve, and it is possible to contribute to prevent occurrences of the acceleration hesitation and knocking.

The throttle opening degree correction means may determine a limiting amount for increase of the target throttle opening degree based on an operation parameter of the internal combustion engine, water temperature for example. In this configuration, amount of the suction air can be controlled corresponding to a fuel supply condition adequately by suppressing the target throttle opening degree with decreasing water temperature for example, so that further smooth operation of the internal combustion engine is possible in the transitional state when the after-start lean-burn control is canceled.

DETAILED DESCRIPTION OF THE PREFERRED EMBODIMENT

Figure 1:
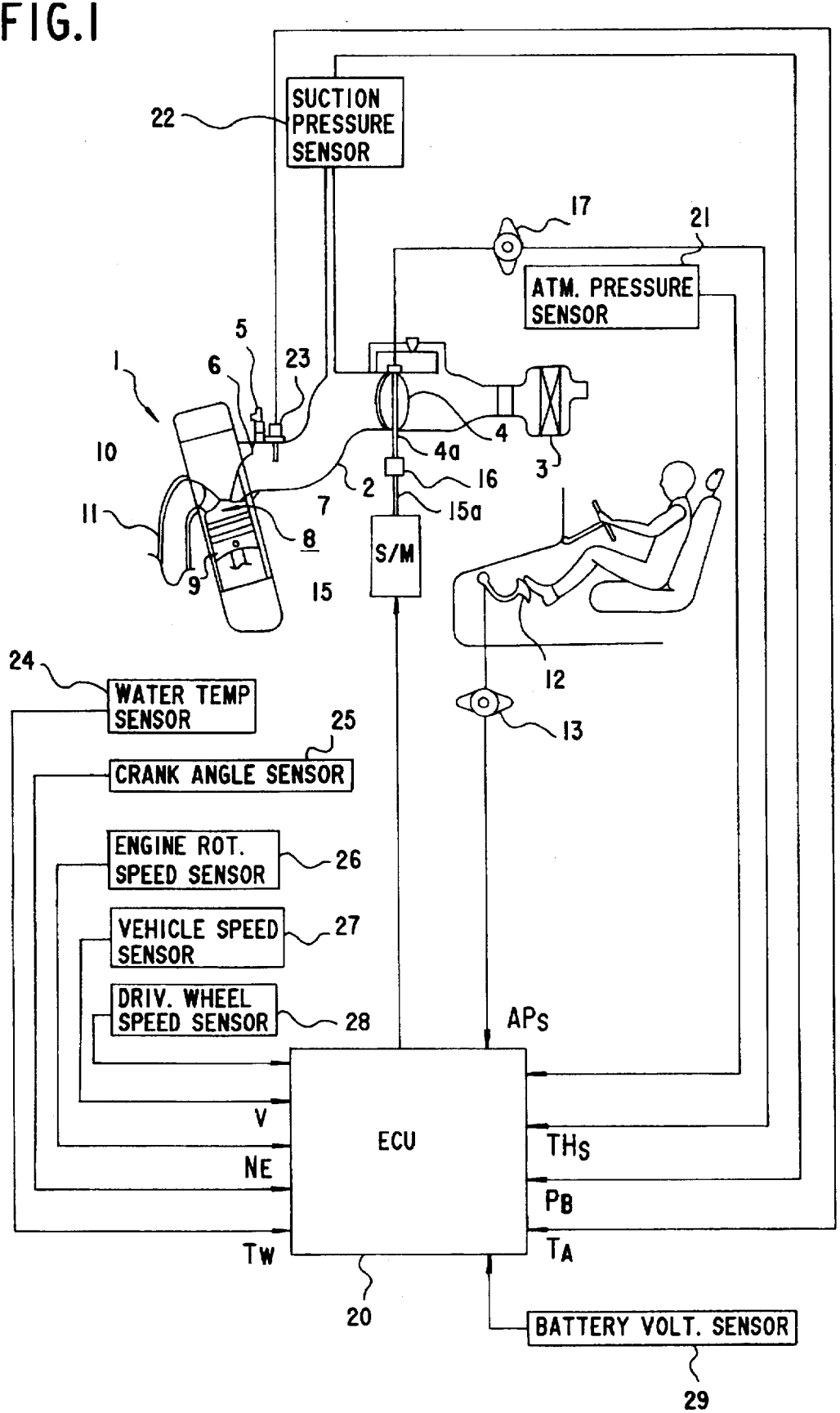
FIG. 1 is a rough view showing an entire fuel supply control apparatus of an internal combustion engine according to one embodiment of the present invention.

Hereinafter, an embodiment of the present invention will be described with reference to FIGS. 1 to 6. In this embodiment, the present invention is applied to an internal combustion engine to be mounted in a vehicle and FIG. 1 is a rough view showing an entire fuel supply control apparatus of the internal combustion engine.

An intake passage 2 for supplying fuel to the internal combustion engine 1 is provided with an air cleaner 3 at an upper stream end, a throttle valve 4 for opening and closing the intake passage 2 at a middle way and a fuel injection valve 5 on a lower stream side. Air introduced in the intake passage 2 through the air cleaner 3 is regulated with respect to the flow rate by the throttle valve 4, enters an intake manifold 6 and then flows into a combustion chamber 8 together with fuel injected from the fuel injection valve 5 through an intake port opened and closed by an intake valve 7.

The mixture thus introduced in the combustion chamber burns to drive a piston 9, then discharges out of the engine through an exhaust port opened and closed by an exhaust valve 10, an exhaust manifold 11 and an exhaust passage.

On a floor of a driving room of a vehicle having the internal combustion engine 1 mounted is arranged an accelerator pedal 12 which is forced to an idle position by a spring and rocks in accordance with a pressing down motion of a driver.

As shown in FIG. 1, the accelerator pedal 12 and the throttle valve 4 are not connected mechanically with each other. The pressed amount of the accelerator pedal 12 is detected by an accelerator sensor 13 composed of a potentiometer provided on a rocking shaft of the accelerator pedal 12, the throttle valve 4 is driven to open and close by a step motor 15, and the step motor 15 is operated by a driving signal from an electronic control unit ECU 20.

A driving shaft 15a of the step motor 15 and a valve shaft 4a of the throttle valve 4 are coaxial and directly connected with each other through a connecting portion 16 without any variable-speed connecting device such as a gear. An angle of rotation in normal or reverse direction of the step motor 15 is nothing but an angle of opening or closing of the throttle valve 4. The opening or closing angle of the throttle valve 4 is detected by a throttle sensor 17 and the detection signal is inputted to ECU 20.

An atmospheric pressure sensor 21 is arranged on the upper stream side of the intake passage 2, a suction pressure sensor 22 is provided on the lower stream side of the throttle valve 4 to detect an absolute pressure of the suction air, and on further lower stream side is provided a suction air temperature sensor 23 for detecting a temperature of the suction air.

In the neighborhood of the combustion chamber 8 of the internal combustion engine 1 is provided a water temperature sensor 24 for detecting a temperature of the cooling water, and within a distributor is provided a crank angle sensor 25. In addition, an engine rotational speed sensor 26, a vehicle speed sensor 27 and a driving wheel speed sensor 28 are provided on suitable positions. Detection signals of the above sensors are inputted to ECU 20.

Other detection signals from various sensors such as a battery voltage sensor 29 for detecting a battery voltage are also inputted to ECU 20. The step motor 15 is a hybrid type 4 phases stepping motor and driven by phase exciting drive mode.

Figure 2:
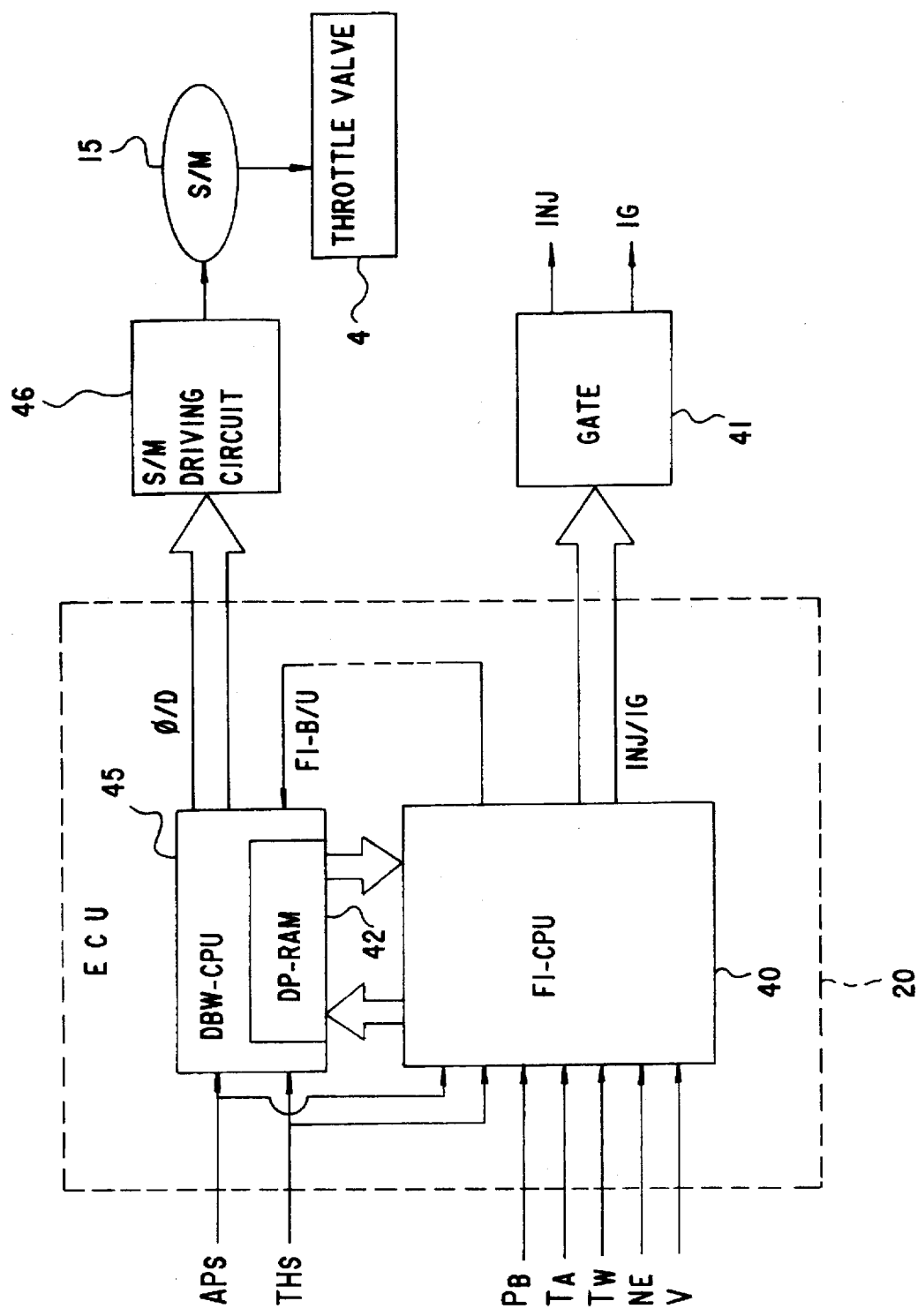
FIG. 2 is a rough block diagram showing a control system of the fuel supply control apparatus.
Figure 3:
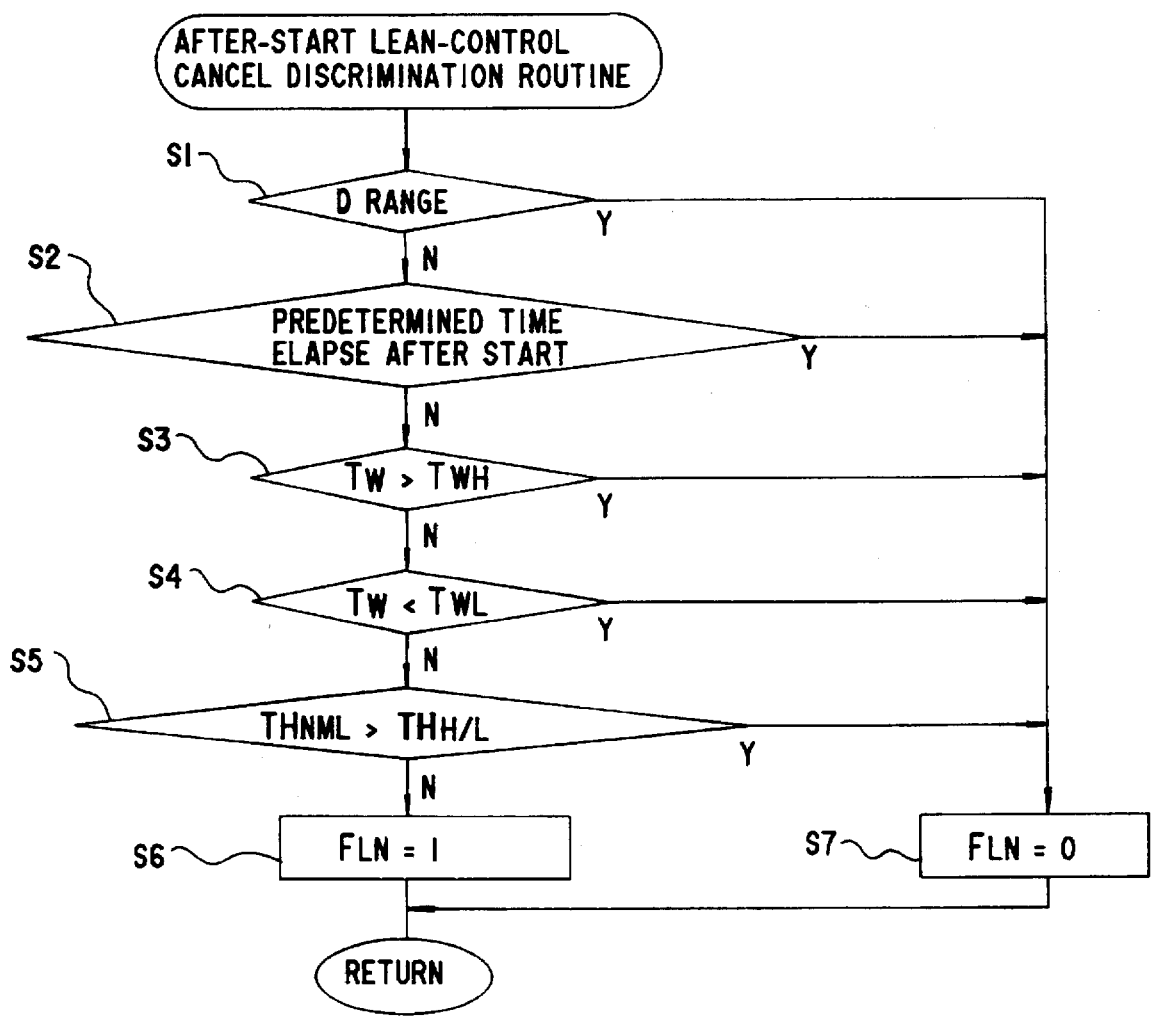
FIG. 3 is a flow chart showing an operation procedure for discriminating cancellation of an after-start lean-burn control.

FIG. 2 is a rough block diagram showing the control system. Within the ECU 20, the fuel supply control is carried out by FI-CPU 40 which is inputted with detection signals from the above-mentioned various sensors detecting operation states of the internal combustion engine such as intake pipe absolute pressure $P_B$, suction air temperature $T_A$, engine cooling water temperature $T_W$, engine rotational speed $N_E$, vehicle speed V, accelerator pedal angle $AP_S$ from the accelerator sensor 13, and throttle valve opening degree $TH_S$ from the throttle sensor 17 for example, and outputs INJ signal for controlling the fuel injection valve 5 based on the operation state and IG signal for controlling the ignition time through a gate 41.

The opening degree control of the throttle valve 4 by the step motor 15 is carried out through DBW-CPU 45. The acceleration pedal angle signal $AP_S$ and the throttle valve opening degree signal $TH_S$ detected by the accelerator sensor 13 and the throttle sensor 17 respectively are inputted into the DBW-CPU 45, an exciting phase signal φ and a duty signal D for driving the step motor 15 is outputted from the DBW-CPU 45 to a step motor drive circuit 46, and the step motor 15 is driven by the step motor drive circuit 46.

The detection signals of the accelerator sensor 13 and the throttle sensor 17 are also inputted to FT-CPU 40 in addition to the signals from sensors detecting states of operation to calculate a target throttle opening degree based on the detection signals. These informations are transmitted to DBW-CPU 45 through DP-RAM 42 which manages give-and-take of signals between FT-CPU 40 and DBW-CPU 45.

DBW-CPU 45 determines a final target throttle opening degree $TH_O$ on the basis of these informations through various corrections on the way, and sets and outputs the above-mentioned exciting phase φ and duty D of the electric current supplied to the step motor 15 to make the throttle opening degree of the throttle valve 4 coincide with the final target throttle opening degree $TH_O$.

In case of some operation states or abnormal states, FI-CPU 40 can perform a role of back up intervening in DP-RAM 42. At this time, transmitting and receiving of signals by DP-RAM 42 are stopped.

The final target throttle opening degree $TH_O$ is calculated by adding an idle throttle opening degree $TH_{IDL}$ to the target throttle opening degree $TH_{NML}$ which is calculated mainly on the basis of the accelerator pedal angle $AP_S$ detected by the accelerator sensor 13, as shown by the following formula (1).

$$TH_O = TH_{NML} + TH_{IDL} \tag{1}$$

The idle throttle opening degree $TH_{IDL}$ in the formula (1) corresponds to a final target throttle opening degree $TH_O$ in an idle state ($TH_{NML}=0$) that the accelerator pedal 12 is not pressed generally. When the accelerator pedal 12 is pressed, the throttle valve 4 starts to open from the idle throttle opening degree $TH_{IDL}$.

The target throttle opening degree $TH_{NML}$ is determined in accordance with the accelerator pedal angle $AP_S$ in view of the idle throttle opening degree $TH_{IDL}$ and obtained by retrieving a map set beforehand.

Figure 4:
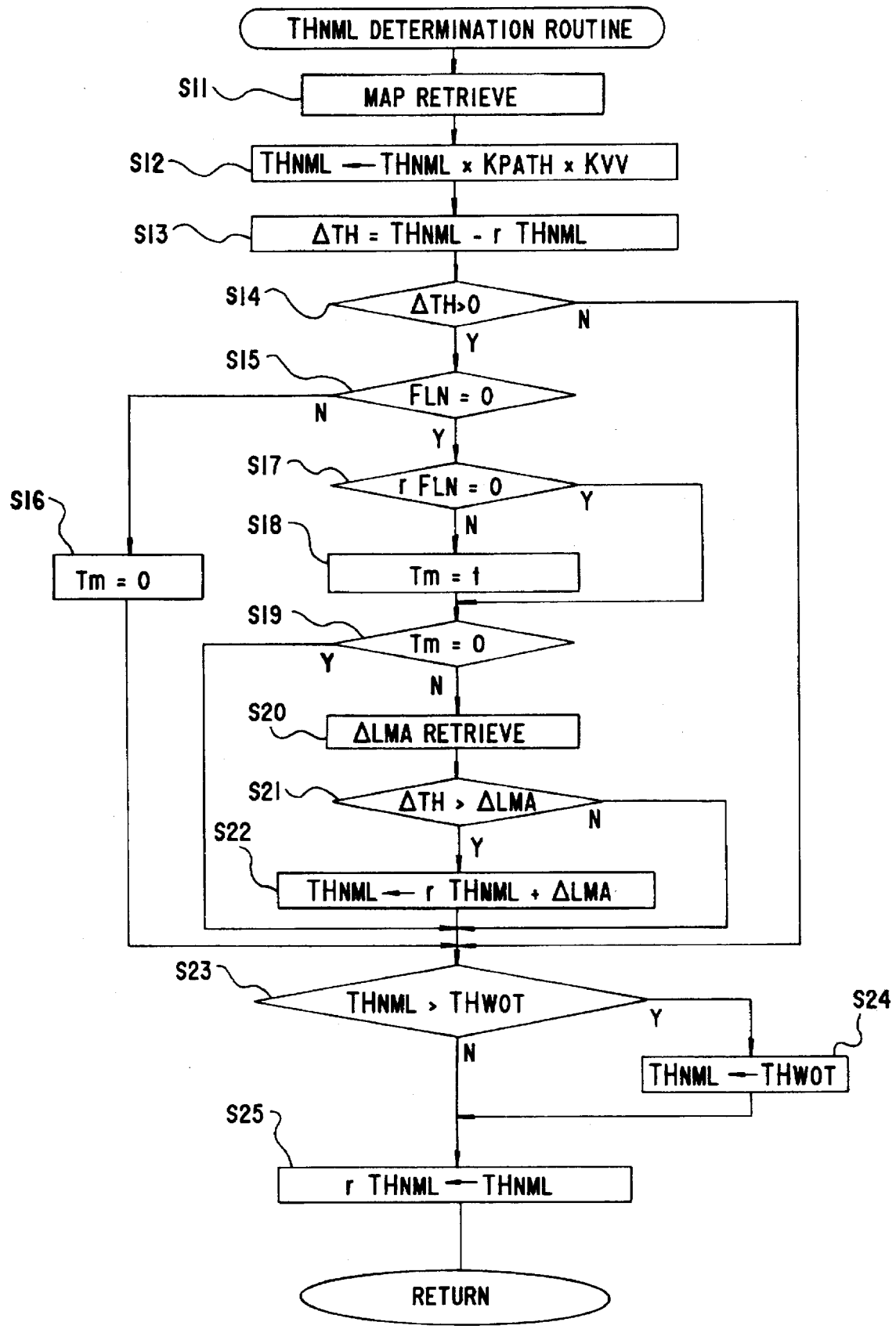
FIG. 4 is a flow chart showing an operation procedure for determining a target throttle opening degree $TH_{NML}$.

The retrieved target throttle opening degree $TH_{NML}$ is not used for driving the throttle valve 4 directly, but further corrected in accordance with the flow chart of FIG. 4 to obtain a decisive value of the target throttle opening degree $TH_{NML}$. The final target throttle opening degree is set by adding the idle throttle opening degree $TH_{IDL}$ to the above decisive value.

On the occasion of the above correction of the target throttle opening degree $TH_{NML}$, the correction according to the present invention is likely to be carried out after cancellation of the after-start lean-burn control. Accordingly, at first, an operation procedure for discriminating cancellation of the after-start lean-burn control will be described with reference to the flow chart of FIG. 3.

At Step 1, whether a shift gear of a vehicle is in D-range which is a normal running made or not is discriminated. When the shift gear is in a range other than D-range, the flow advances to Step 2. When the shift gear is in D-range, the flow jumps to Step 7 for setting a after-start lean flag $F_{LN}$ to "0" and instructing cancellation of the after-start lean-burn control.

At Step 2, whether a predetermined time during which lean-burn control immediately after starting is to be carried out elapsed or not is discriminated. The flow advances to Step 3 when the time does not elapse or jumps to FIG. 7, when the time elapsed, for setting the after-start lean flag $F_{LN}$ to "0" and instructing cancellation of the after-start lean-burn control.

When the flow advances to Step 3, whether cooling water temperature $T_W$ of the internal combustion engine is within a temperature range ($T_{WL} \leq T_W \leq T$) adapted for the after-start lean-burn control with no difficulty or not is discriminated in Steps 3, 4. When the cooling water temperature is within the temperature range, the flow advances to Step 5 and when out of the temperature range, jumps to Step 7 to set the after-start lean flag $F_{LN}$ to "0".

At Step 5, whether the target throttle opening degree $TH_{NML}$ is lower than an upper limit value $TH_{H/L}$ for the after-start lean-burn control with no difficulty or not is discriminated. When $TH_{NML}$ is lower than the upper limit value $TH_{H/L}$, the flow advances to Step 6 to set the after-start lean flag $F_{LN}$ to "1" and instruct after-start lean-burn control. When $TH_{NML}$ is higher than the upper limit value $TH_{H/L}$, the flow advances to Step 7 to set the after-start lean flag $F_{LN}$ to "0".

Namely, only when conditions such that the shift range is not D-range, it is within a predetermined time after starting, cooling water temperature $T_W$ of the internal combustion engine is within a predetermined temperature range and the target throttle opening degree $TH_{NML}$ is not exceed a predetermined upper limit value are all satisfied, the after-start lean-burn control is carried out with the after-start lean flag $F_{LN}$ set to "1". When any one of the above conditions is not satisfied, the after-start lean flag $F_{LN}$ is set to "0" to instruct cancellation of the after-start lean-burn control.

When starting of the vehicle is expected by pressing down of the accelerator pedal 12 during the after-start lean-burn control is being carried out, the after-start lean-burn control is canceled as soon as possible to ensure an early increasing of the fuel supply and prevent occurrence of the acceleration hesitation.

Figure 5:
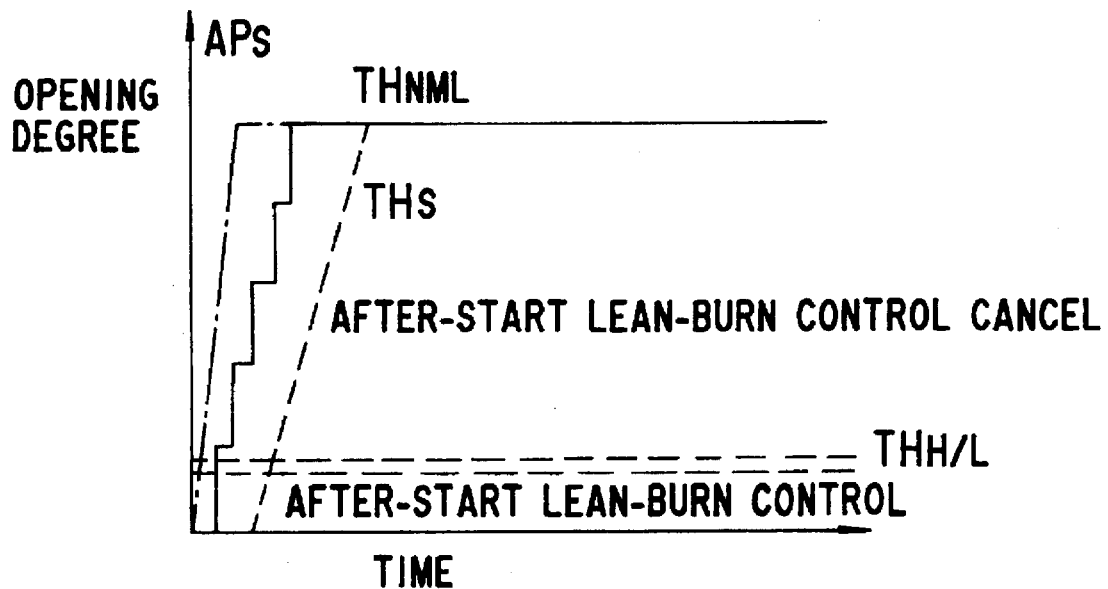
FIG. 5 is a graph showing responses of accelerator pedal angle $AP_S$, target throttle opening degree $TH_{NML}$ and throttle opening degree $TH_S$.

FIG. 5 shows responses of the accelerator pedal angle $AP_S$, the target throttle opening degree $TH_{NML}$ and the throttle opening degree $TH_S$ when the accelerator pedal is pressed down. As a matter of course, the response times are larger in order of the accelerator pedal angle $AP_S$ (dot-dash line), the target throttle opening degree $TH_{NML}$ (solid line) and the throttle opening degree $TH_S$ (broken line).

In the Japanese Patent Application No. Hei 7-61784, since cancellation of the after-start lean-burn control is judged based on the throttle opening degree $TH_S$, fuel supply cannot be in time for increase of the suction air and there is a fear that the acceleration hesitation occurs. According to the present embodiment, when the target throttle opening degree $TH_{NML}$ (solid line) exceed the upper limit value $TH_{H/L}$, cancellation of the after-start lean-burn control is instructed. That is, before the throttle opening degree is increased to increase the suction air, the after-start lean-burn control is canceled so that the fuel supply can be increased beforehand to prevent occurrence of the acceleration hesitation and knocking.

As understood from FIG. 5 too, the cancellation of the after-start lean-burn control may be judged based on the accelerator pedal angle $AP_S$ in this case, the cancellation can be instructed earlier.

Based on thus determined after-start lean flag $F_{LN}$, the flow chart of FIG. 4, which is a operation for correcting the target throttle opening degree $TH_{NML}$, is executed. At first, the target throttle opening degree $TH_{NML}$ based on the accelerator pedal angle $AP_S$ is retrieved from the map (Step 11), next, the target throttle opening degree $TH_{NML}$ is corrected by multiplying it by an atmospheric pressure correction coefficient $T_{PATH}$ and a vehicle speed correction coefficient $K_{VV}$ (Step 12), then the flow advances to Step 13.

At Step 13, a fluctuation width $\Delta_{TH}$ is obtained by subtracting the preceding value $rTH_{NML}$ of the target throttle opening degree from the new value $TH_{NML}$ of the target throttle degree on this time. $\Delta_{TH}$ indicates driving direction of the throttle valve 4 (opening or closing) by its plus or minus sign and indicates degree of acceleration and deceleration to be given to the vehicle.

In the next step 14, whether $\Delta_{TH}$ is plus or minus is discriminated. When $\Delta_{TH}$ is plus and so the throttle valve 4 is to be driven toward opening side for acceleration, the flow advances to Step 15. When $\Delta_{TH}$ is minus and so the throttle valve 4 is to be driven toward closing side, the flow jumps to Step 23 and correction of the target throttle opening degree $TH_{NML}$ is not carried out.

When the flow advances to Step 15 for acceleration, firstly whether the after-start lean flag $F_{LN}$ is set to "0" to cancel the after-start lean-burn control or not is discriminated. In case that the after-start lean-burn control is not canceled yet ($F_{LN}$=1), the flow advances to Step 16 and if the timer Tm has been set, the setting is canceled, then the flow advances to Step 23. In case that the after-start lean-burn control has been canceled ($F_{LN}$=0) at Step 15, the flow advances to Step 17.

At Step 17, whether the preceding after-start lean flag $rF_{LN}$ is "0" or not is discriminated. If the $rF_{LN}$ is "1", it means that the after-start lean flag $F_{LN}$ changed to "0" for the first time, namely the after-start lean-burn control was canceled for the first time, so that the flow advances to Step 18 to set a predetermined time t in the timer Tm. Next time, the flow jumps to Step 19 from Step 17 ($rF_{LN}$=0), that is, the timer Tm is not reset and continues the time counting.

At Step 19, whether the time set in the timer Tm is up (Tm=0) or not is discriminated, and the flow advances to Step 20 so long as the time is not up and jumps to Step 23 when the time is up. Within the predetermined time t set in the timer Tm, $\Delta$ upper limit value $\Delta_{LMA}$ is retrieved based on cooling water temperature $T_W$ of the internal combustion engine.

Figure 6:
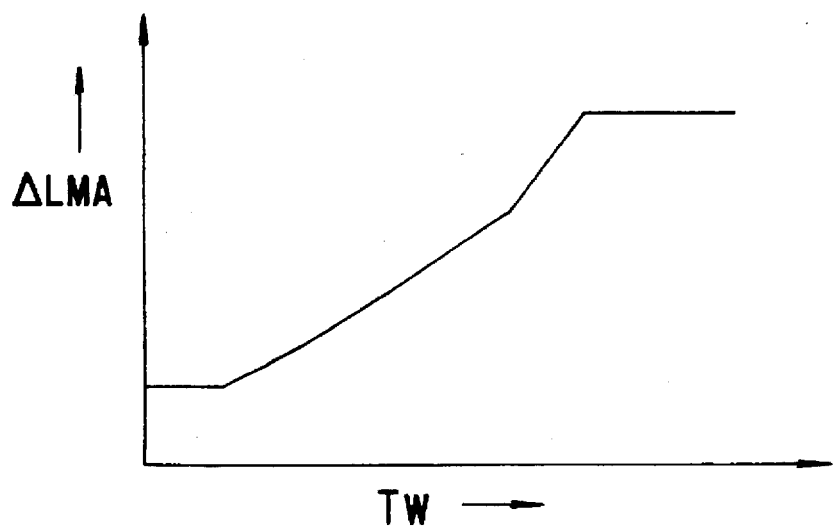
FIG. 6 is a graph showing relation of Δ upper limit value $\Delta_{LMA}$ to cooling water temperature of an internal combustion engine.

The $\Delta$ upper limit value $\Delta_{LMA}$ means an upper limit value of the fluctuation width $\Delta_{TH}$ of the target throttle opening degree $TH_{NML}$ indicating degree of acceleration of the vehicle. FIG. 6 is a graph representing a map for retrieving the Δ upper limit value $\Delta_{LMA}$ from the cooling water temperature $T_W$ of the internal combustion engine. The higher the cooling water temperature is, the Δ upper limit value $\Delta_{LMA}$ is set to the larger value.

When the cooling water temperature $T_W$ of the internal combustion engine is higher, ratio of the fuel contributing to the combustion to the whole mixture is larger and even if amount of suction air increases because of enlarged throttle opening degree, fuel supply can follow it easily, therefore the large Δ upper limit value $\Delta_{LMA}$ can be set. Accordingly, smooth and responsive operation of the internal combustion engine in a transitional state when the after-start lean-burn control is canceled becomes possible by determining a pertinent Δ upper limit value $\Delta_{LMA}$ corresponding to the cooling water temperature $T_W$ of the internal combustion engine beforehand.

After the above-mentioned Δ upper limit value $\Delta_{LMA}$ is retrieved at Step 20, the fluctuation width $\Delta_{TH}$ of the target throttle opening degree $TH_{NML}$ is compared with the Δ upper limit value $\Delta_{LMA}$ at Step 21. When the fluctuation width $\Delta_{TH}$ is larger than the Δ upper limit value $\Delta_{LMA}$, the flow advances to Step 22 and the target throttle opening degree is set to a new value obtained by adding the Δ upper limit value $\Delta_{LMA}$ to the preceding value $rTH_{NML}$. When the fluctuation width $\Delta_{TH}$ is smaller than the Δ upper limit value $\Delta_{LMA}$, the flow jumps to Step 23 from Step 21, and the target throttle opening degree $TH_{NML}$ remains as the value set at Steps 11, 12.

Namely, in case of a steep acceleration that the fluctuation width $\Delta_{TH}$ of the target throttle opening degree $TH_{NML}$ exceeds the Δ upper limit value $\Delta_{LMA}$, fluctuation width of increase of acceleration is suppressed to $\Delta_{LMA}$ and increase of throttle opening degree of the throttle valve 4 is suppressed.

In such a manner, if the accelerator pedal 12 is pressed down largely to cause a steep acceleration immediately after the after-start lean-burn control is canceled, increase of the target throttle opening degree $TH_{NML}$ is suppressed to limit opening of the throttle and suppress increase of amount of suction air so that occurrence of inconveniences such as the acceleration hesitation and knocking can be prevented without causing unnecessary lean state to realize a smooth operation.

It is to be noted that the above control for suppressing increase of suction air amount is carried out only in a transitional state immediately after the after-start lean-burn control limited within a predetermined time set in the timer Tm.

What is claimed is:

1. A suction air control apparatus of an internal combustion engine which is subjected to an after-start lean-burn control to be operated at a lean mixture ratio rather than a theoretical mixture ratio in a duration immediately after starting, comprising:

throttle opening degree control means for driving a throttle valve of a suction system to control a throttle opening degree to a target throttle opening degree set in accordance with an operation state of the internal combustion engine for regulating amount of the suction air;

after-start lean-burn control cancel discrimination means for discriminating cancellation of the after-start lean-burn control of the internal combustion engine;

steep acceleration discrimination means for discriminating whether an acceleration of a vehicle is a steep acceleration higher than a predetermined acceleration or not; and throttle opening degree correction means for correcting said target throttle opening degree to limit increase of the target throttle opening degree when said after-start lean-burn control cancel discrimination means discriminates cancellation of the after-start lean-burn control and said steep acceleration discrimination means discriminates the steep acceleration of the vehicle.

2. A suction air control apparatus of an internal combustion engine claimed in claim 1, wherein said after-start lean-burn control cancel discrimination means discriminates cancellation of the after-start lean-burn control based on an amount of pressing of an accelerator pedal or said target throttle opening degree.

3. A suction air control apparatus of an internal combustion engine claimed in claim 1, wherein said throttle opening degree correction means determines a limiting amount for increase of said target throttle opening degree based on an operation parameter of the internal combustion engine.

4. A suction air control apparatus of an internal combustion engine claimed in claim 2, wherein said throttle opening degree correction means determines a limiting amount for increase of said target throttle opening degree based on an operation parameter of the internal combustion engine.

* * * * *